Patented June 19, 1945

2,378,619

UNITED STATES PATENT OFFICE 2,378,619

STABILIZATION OF RESIN COMPOSITIONS

Thomas S. Carswell, Longmeadow, Mass., assignor to Monsanto Chemical Company, St. Louis, Mo., a corporation of Delaware No Drawing. Application November 1, 1941, Serial No. 417,478

15 Claims. (Cl. 260—73)

This invention relates to polyvinyl acetal resin compositions and, more particularly, to polyvinyl acetal resin compositions employed as safety glass interlayer material.

Polyvinyl acetal resins may be prepared by various methods. One method, for example, comprises reacting an aldehyde with a product of hydrolysis of a polyvinyl ester dissolved in a suitable solvent, in the presence of a mineral acid catalyst, for example, sulfuric acid. The resulting polyvinyl acetal resin is then generally precipitated and stabilized, for example, by a process comprising treatment with a fixed alkali. Such a product has proved to be adaptable for many purposes, for example, in preparing interleaf material for safety glass. However as is well-known to those skilled in the art, interleaf compositions comprising such an alkali-stabilized polyvinyl acetal resin have certain disadvantages, for example, their adhesion to glass is substantially reduced when their moisture content exceeds substantially 0.4%.

According to the present invention, improved polyvinyl acetal resins are obtained by incorporating therein quaternary ammonium bases. More particularly, it has been found that polyvinyl acetal resins prepared in the presence of a mineral acid catalyst possess improved characteristics when quaternary ammonium bases are added to the polyvinyl acetal resins. In carrying out the process of the present invention, the quaternary ammonium base may be added as the sole alkaline treating agent for the polyvinyl acetal resin or the quaternary ammonium base may be employed in addition to other alkaline treating agents, as for example, such inorganic bases as potassium hydroxide.

In order to illustrate the present invention, the following specific examples are given. It is understood that these examples are illustrative of this invention and not limitative of the scope thereof. The parts are parts by weight in all examples.

Example 1

Vinyl acetate was suitably polymerized to such a degree that a one molar benzene solution possessed a viscosity of substantially 50 centipoises at 20° C. The resulting polyvinyl acetate was then hydrolyzed in a well-known manner and the hydrolysis product reacted with butyraldehyde in alcohol solution in the presence of a suitable quantity of sulfuric acid. The resulting polyvinyl butyraldehyde acetal resin was precipitated by the addition of water and suitably washed with water. The resulting precipitate was then suspended in an amount of a solution of ethanol in water, containing substantially 37% ethanol, equivalent to substantially 1000 parts of the suspension medium for every 100 parts of polyvinyl acetal resin. The foregoing suspension was then maintained at substantially 45° C. for substantially 5 hours under suitable conditions of agitation while being maintained slightly alkaline by the addition of suitable quantities of dimethyl dibenzyl ammonium hydroxide.

After the foregoing treatment, the polyvinyl butyraldehyde acetal resin was separated from the suspension medium, suitably washed and dried in a well-known manner. The polyvinyl butyraldehyde acetal resin was found to contain substantially 17–22% hydroxyl groups calculated as polyvinyl alcohol, less than 3% acetate by weight and the balance substantially acetal and is a type of polyvinyl acetal resin commonly called a partial polyvinyl acetal resin.

Example 2

The process described in Example 1 was repeated with the substitution of trimethyl benzyl ammonium hydroxide for dimethyl dibenzyl ammonium hydroxide. The product obtained was similar to that obtained in Example 1.

The stabilized polyvinyl butyraldehyde acetal resins described in the foregoing examples were found to possess a high degree of resistance to such deteriorating influence as heat and, at the same time, to be substantially free from inorganic salts. Other remarkable characteristics of the products described in these examples are set forth hereinafter.

The following example sets forth another embodiment of this invention wherein polyvinyl butyraldehyde acetal resin is treated initially with an inorganic base and then with a quaternary ammonium base.

Example 3

A polyvinyl butyraldehyde acetal resin was prepared in the same manner as in Example 1. The washed precipitate of the polyvinyl butyraldehyde acetal resin was suspended in an ethanol-water mixture as in Example 1. The resulting suspension was then rendered alkaline to the same degree as in Example 1 by the addition of the required amount of potassium hydroxide. Thereafter, the resin suspension was heated at substantially 45° C. for substantially 5 hours with the addition of sufficient dimethyl dibenzyl ammonium hydroxide to maintain the alkalinity substantially constant during the heating step.

The resulting polyvinyl butyraldehyde acetal resin was found to possess a high degree of resistance to such deteriorating influences as heat, in addition to the further advantages set forth hereinafter.

Plastic compositions comprising the polyvinyl butyraldehyde acetal resins described in the foregoing examples were most unexpectedly found to possess excellent adhesion to glass even when containing a moisture content in excess of 0.4%. This improvement in adhesion to glass of compositions comprising the products described in Examples 1, 2 and 3 is clearly set forth in the table below. In this table compositions containing the products of Examples 1, 2 and 3 are compared with a similar composition containing a typical prior polyvinyl butyraldehyde acetal resin treated in the same manner as in Examples 1, 2 and 3 except that, in this case, the alkalinity of the suspension medium was maintained by the addition of potassium hydroxide as the sole alkaline treating agent.

In all the compositions set forth in the table below, a moisture content of 0.5-1.0% was maintained in order to accentuate the improved characteristics of the compositions containing the products of Examples 1, 2 and 3.

In preparing the compositions set forth in the table below, the plasticizer was incorporated with the polyvinyl acetal resin by means of suitable mixing equipment, for example, a Read mixer. The plasticizer employed in each of these compositions was the triethylene glycol ester of coconut oil acids described in United States Patent 2,194,013.

The adhesion results given in the following table were obtained by laminating, in a well-known manner, suitably prepared sheets of the polyvinyl acetal resin compositions substantially 0.015 inch in thickness between sheets of plate glass substantially ⅛ inch in thickness, cooling the resulting laminated safety glass to substantially 0° F. and then shattering the glass with hammer blows. The evaluation of the adhesion characteristics of each resin composition was made by noting the proportion of the glass particles that failed to adhere to the resin composition.

| Resin | Plasticizer | Adhesion to glass |
|---|---|---|
| | Parts | |
| A. From Example 1—100 parts | 45 | Excellent. |
| B. From Example 2—100 parts | 45 | Do. |
| C. From Example 3—100 parts | 45 | Do. |
| D. Prior type of polyvinyl butyraldehyde acetal resin. | 45 | Very poor. |

In addition to the advantages set forth hereinbefore, it has been found that safety glass containing as the interlayer material, compositions containing the resins described in Examples 1, 2 and 3, possesses, in general, the desirable properties of safety glass hereinbefore obtained. Thus, for example, safety glass containing as the interlayer, compositions containing the resins described in Examples 1, 2 and 3, was found to possess a high resistance to breakage, both at high and low temperatures, when tested in a manner well-known to those skilled in the art.

This invention is not limited as to the polyvinyl acetal resin employed or its method of preparation. Thus, in the preparation of the resin given hereinbefore the vinyl acetate may be replaced by other suitable vinyl esters. In addition, the degree of polymerization of the vinyl acetate or other vinyl ester may be widely varied and other suitable methods of hydrolyzing the polyvinyl ester may be employed when advantageous.

In place of butyraldehyde, other carbonyl-containing compounds may be employed, as for example, formaldehyde, acetaldehyde, propionaldehyde, valeraldehyde, crotonaldehyde, cyclohexanone, and the like and mixtures thereof. Furthermore, the polyvinyl acetal resin is not limited to any specific hydroxyl, ester or acetal group content.

The quaternary ammonium bases employed according to this invention may be widely varied in composition. Thus, the organic radicals in the quaternary ammonium bases may be aliphatic, alicyclic, aromatic and the like. Examples of quaternary ammonium bases that may be employed according to this invention include dimethyl dibenzyl ammonium hydroxide, trimethyl benzyl ammonium hydroxide, tetraethyl ammonium hydroxide, tetraethanol ammonium hydroxide, and the like. The proportion of quaternary ammonium base employed may be varied to a considerable degree, the exact amount depending on the particular method of preparing and treating the polyvinyl acetal resin and the properties desired in the final product. Preferably, as indicated hereinbefore, sufficient quaternary ammonium base is employed to render the polyvinyl acetal resin at least slightly alkaline.

Furthermore, the method of treating the polyvinyl acetal resins with the quaternary ammonium bases is not limited to the procedure indicated in Examples 1, 2 and 3 and any advantageous procedure may be employed. When advantageous, mixtures of quaternary ammonium bases may be employed according to this invention.

When the compositions of the present invention are to be employed in forming interlayer material for safety glass, they may be processed in any suitable manner, for example, by cutting sheets of the desired thickness from suitably prepared press-blocks, by extrusion in the absence of solvent, by depositing a solution of the composition in a suitable solvent on a suitable base and then removing the solvent or by pressing a suitable amount of the composition between sheets of glass, etc.

This invention is limited solely by the claims attached hereto.

What is claimed is:

1. A stabilized plastic composition of matter comprising a polyvinyl acetal resin and a saturated quaternary ammonium hydroxide.

2. A composition of matter comprising a polyvinyl acetal resin and an alkyl quaternary ammonium hydroxide.

3. A composition of matter comprising a polyvinyl acetal resin and an alkyl, aryl quaternary ammonium base.

4. A composition of matter possessing improved adhesion to glass comprising a partial polyvinyl butyraldehyde acetal resin, a plasticizer and tetraethyl ammonium hydroxide.

5. A composition of matter possessing improved adhesion to glass comprising a partial polyvinyl butyraldehyde acetal resin, a plasticizer and dimethyl dibenzyl ammonium hydroxide.

6. A composition of matter possessing improved adhesion to glass comprising a partial polyvinyl butyraldehyde acetal resin, a plasticizer and trimethyl benzyl ammonium hydroxide.

7. In the stabilization of a polyvinyl acetal resin, the step which comprises treating said resin with a saturated quaternary ammonium hydroxide.

8. In the stabilization of a polyvinyl acetal resin formed in the presence of an acid catalyst, the step which comprises incorporating therewith a saturated quaternary ammonium hydroxide.

9. In the stabilization of an inorganic alkali-treated polyvinyl acetal resin formed in the presence of a mineral acid catalyst, the step which comprises incorporating therewith a saturated quaternary ammonium hydroxide.

10. A process of preparing an improved polyvinyl acetal resin formed in the presence of a mineral acid which comprises treating said resin with a saturated quaternary ammonium hydroxide as the sole alkaline treating agent.

11. In the stabilization of a polyvinyl acetal resin, the step which comprises treating said resin with an alkyl quaternary ammonium hydroxide.

12. In the stabilization of a polyvinyl acetal resin, the step which comprises treating said resin with an alkyl, aryl quaternary ammonium base.

13. In the stabilization of a partial polyvinyl butyraldehyde acetal resin, the step which comprises incorporating therewith tetraethyl ammonium hydroxide.

14. In the stabilization of a partial polyvinyl butyraldehyde acetal resin, the step which comprises incorporating therewith dimethyl dibenzyl ammonium hydroxide.

15. In the stabilization of a partial polyvinyl butyraldehyde acetal resin, the step which comprises incorporating therewith trimethyl benzyl ammonium hydroxide.

THOMAS S. CARSWELL.